United States Patent [19]
Hochgraf

[11] Patent Number: 6,072,707
[45] Date of Patent: Jun. 6, 2000

[54] HIGH VOLTAGE MODULAR INVERTER

[75] Inventor: Clark Glenn Hochgraf, Levonia, Mich.

[73] Assignee: Siemens Power Transmission & Distribution, Inc., Wendell, N.C.

[21] Appl. No.: 09/177,744

[22] Filed: Oct. 23, 1998

[51] Int. Cl.[7] .................... H02M 7/00; H02M 7/5387; H02M 7/521
[52] U.S. Cl. .............. 363/71; 363/132; 363/136
[58] Field of Search ................. 363/17, 40, 71, 363/95, 98, 65, 132, 136

[56] References Cited

U.S. PATENT DOCUMENTS

| | | | |
|---|---|---|---|
| 4,467,407 | 8/1984 | Asano et al. | 363/43 |
| 4,641,232 | 2/1987 | Pitel | 363/71 |
| 4,674,024 | 6/1987 | Paice et al. | 363/71 |
| 5,187,652 | 2/1993 | Steimer | 363/37 |
| 5,245,520 | 9/1993 | Imbertson | 363/17 |
| 5,625,545 | 4/1997 | Hammond | 363/71 |
| 5,642,275 | 6/1997 | Peng et al. | 363/137 |
| 5,684,683 | 11/1997 | Divan et al. | 363/71 |
| 5,805,437 | 9/1998 | Gruning | 363/71 |
| 5,875,103 | 2/1999 | Bhagwat et al. | 363/71 |

*Primary Examiner*—Peter S. Wong
*Assistant Examiner*—Bao Q. Vu
*Attorney, Agent, or Firm*—Eckert Seamans Cherin & Mellott, LLC

[57] ABSTRACT

A high voltage inverter cascades a plurality of multiple voltage level inverter modules each fed by an isolated dc energy unit to reduce the number of stages of the inverter required to generate a desired ac voltage. Thus, where the dc energy unit includes the secondary winding of an ac transformer, the number of each winding needed is reduced. By using active rectifiers operated in a boost mode to convert the transformer secondary voltage to dc for powering the inverter modules, regenerative operation can be achieved.

2 Claims, 6 Drawing Sheets

HIGH VOLTAGE MODULAR INVERTER

BACKGROUND OF THE INVENTION

1. Field of the Invention

This invention relates to high voltage, solid state inverters used in such applications as motor drives and custom power applications. More particularly, it relates to such inverters in which cascaded multiple voltage level inverter modules provide a high voltage output with a reduced number of transformers and rectifiers needed to provided isolated dc power to the modules.

2. Background Information

High voltage inverters such as those used in motor drives or in custom power applications frequently require a step-up transformer to boost a relatively low inverter voltage up to the application voltage. To eliminate this step-up transformer, it is known to use series-connected switching devices to generate the desired high voltage directly. This method suffers from difficulties in maintaining equal sharing of voltage across the device string and relatively high harmonics. Another technique for eliminating the need for a step-up transformer is to connect inverter H bridges in series. This results in better control of the device voltages and lower output harmonics. However, each inverter bridge requires a separate energy supply transformer winding or other energy source.

There is a need therefore for an improved high voltage inverter that avoids the problem of voltage sharing associated with inverters relying on series-connected switches to generate the desired high voltage.

There is an associated need for such a high voltage inverter with reduced harmonics.

There is a further need for such an inverter which can produce high voltages with a reduced number of isolated dc energy sources required.

There is a particular need for such high voltage inverters using transformers and a rectification stage to produce the dc voltage required which minimize the number of secondary transformer windings required.

SUMMARY OF THE INVENTION

These needs and others are satisfied by the invention which is directed to a high voltage inverter having a plurality of multiple-voltage-level inverter modules connected in series at their ac terminals to generate the required ac voltage amplitude. The multiple-voltage-level modules reduce the number of stages needed to generate the required voltage, as they can each accept a higher transformer secondary voltage utilizing the same switching devices as the conventional two voltage level inverters. Thus, with fewer modules required, fewer isolated dc stages are needed. Where the dc voltage is generated by rectified transformer secondary voltage, fewer secondary transformer windings, and their associated rectifiers are needed.

By using active rectifiers in a buck/boost mode in association with the transformer secondary windings, bidirectional power flow can be achieved allowing use of the inverter as a regenerative motor drive.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
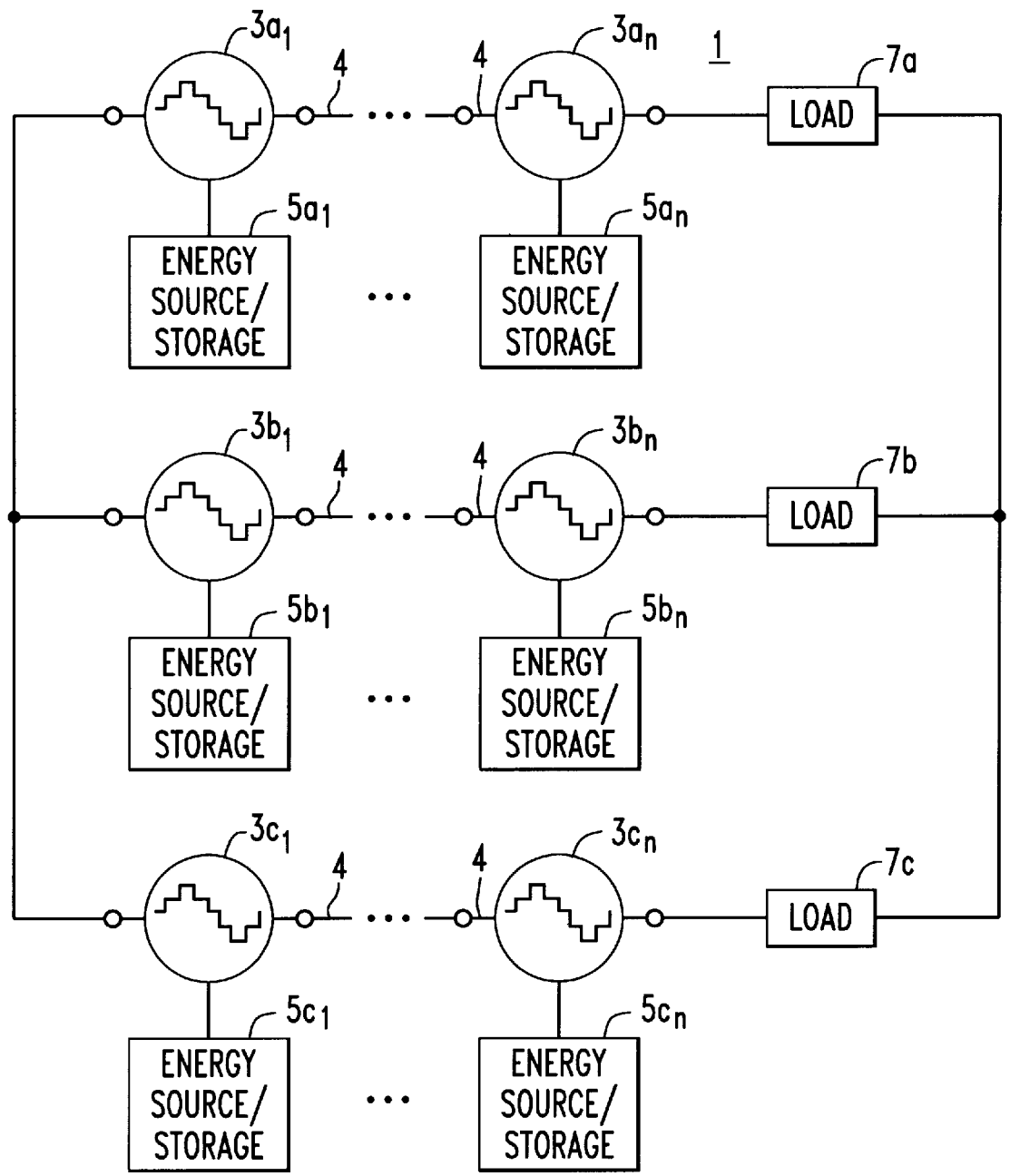
FIG. 1 is a schematic circuit diagram of a modular high-voltage inverter in accordance with the invention.

FIG. 1 illustrates a high voltage inverter 1 in accordance with the invention. The exemplary inverter is a three-phase wye connected inverter in which each phase includes a plurality of multiple-voltage-level inverter modules $3a_1$–$3c_n$ cascaded by series connections 4. The phases of the inverter could also be delta connected. Each inverter module 3 has an energy source/storage device $5a_1$–$5c_n$. The exemplary inverter 1 provides three-phase power to a load 7a–7c which may be a three-phase load or three single-phase loads. The voltage generated in each phase of the inverter 1 is the sum of the voltages generated by the individual inverter modules 3 in the phase. As is evident from FIG. 1, an isolated energy source/storage device 5 is required for each of the inverter modules 3. The present invention reduces the number of inverter modules 3 required to generate a given voltage thereby reducing the number of energy source/storage devices 5 required.

Figure 2:
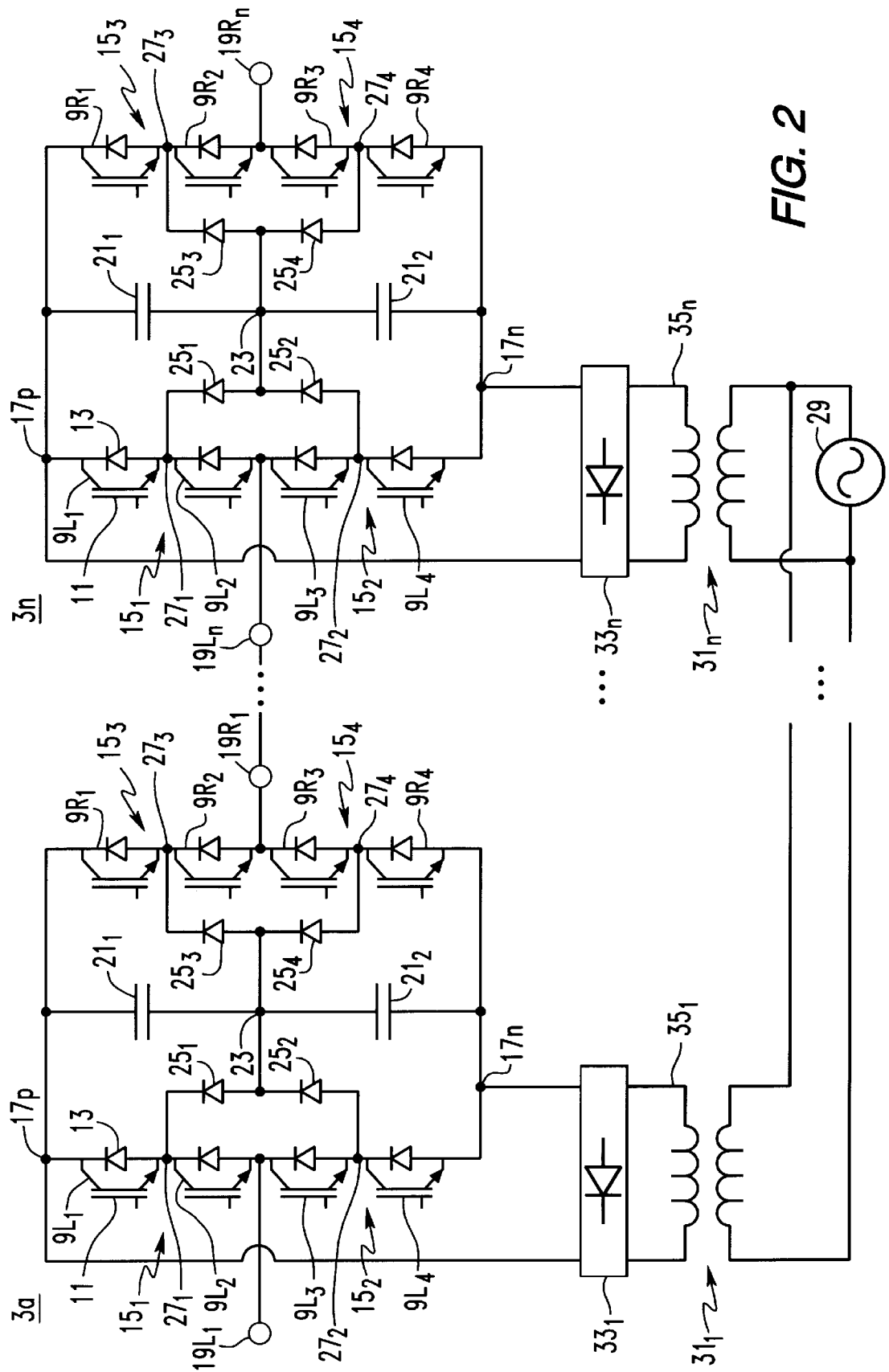
FIG. 2 is a schematic circuit diagram of three-level-inverter modules which are cascaded to produce the inverter of FIG. 1.

FIG. 2 illustrates the series connection of the multiple-voltage-level inverter modules 3 which is used to produce an arbitrarily high output voltage. The inverter modules shown in FIG. 2 have three-level poles. Each module 3 includes eight switch units $9L_1$–$9L_4$ and $9R_1$–$9R_4$ arranged in left and right poles 9L and 9R each having four switch units 9. Each of the switch units 9 include a static power switch 11 such as an insulated gate bipolar transistor (IGBT) or a gate turn off thyristor (GTO), and an anti-parallel diode 13. A first pair $15_1$ of the switch units comprising the switches $9L_1$ and $9L_2$ is connected between a positive dc terminal 17p and a first ac terminal $19L_1$. The static switch units $9L_3$ and $9L_4$ make up a second pair $15_2$ of static switch units which are connected between the first ac terminal $19L_1$ and the negative dc terminal 17n of the inverter module 3. The pair $15_3$ of static switch units $9R_1$ and $9R_2$ are connected between the positive dc terminal 17p and the second ac terminal $19R_1$ while the final pair $15_4$ of switch units $9R_3$ and $9R_4$ are connected between the second ac terminal $19R_1$ and the negative dc terminal 17n. A first capacitor $21_1$ which forms part of the dc energy source/storage device 5 is connected between the positive dc terminal 17p and a midpoint 23. In a similar manner, a second capacitor 21 $2_2$ is connected between the midpoint 23 and a negative dc bus 17n. Four diodes 25 $1_1$–25 $4_4$ are connected between the midpoint 23 and a node 27 $_1$–27 $_4$ between the switch units 9 of each of the pairs 15 $_1$–15 $_4$ of the static switch units. These diodes 25 $_1$–25 $_4$ are polarized to conduct current to the midpoint when 9L $_2$+9L $_3$ are turned on.

The energy source/storage units 5 in the example of FIG. 2 include a common ac source 29 feeding a transformer 31 $_1$–31 $_n$ for each of the inverter modules 3. Rectifier units 33 $_1$–33 $_n$ are connected to the secondary windings 35 $_1$–35 $_n$ of the transformers 31 to provide dc voltage to the dc terminals 17p, 17 $_n$ of the inverter modules 3 which charges the capacitors 21 $_1$ and 21 $_2$. The transformer/rectifier/source may be single or three-phase.

Figure 3:
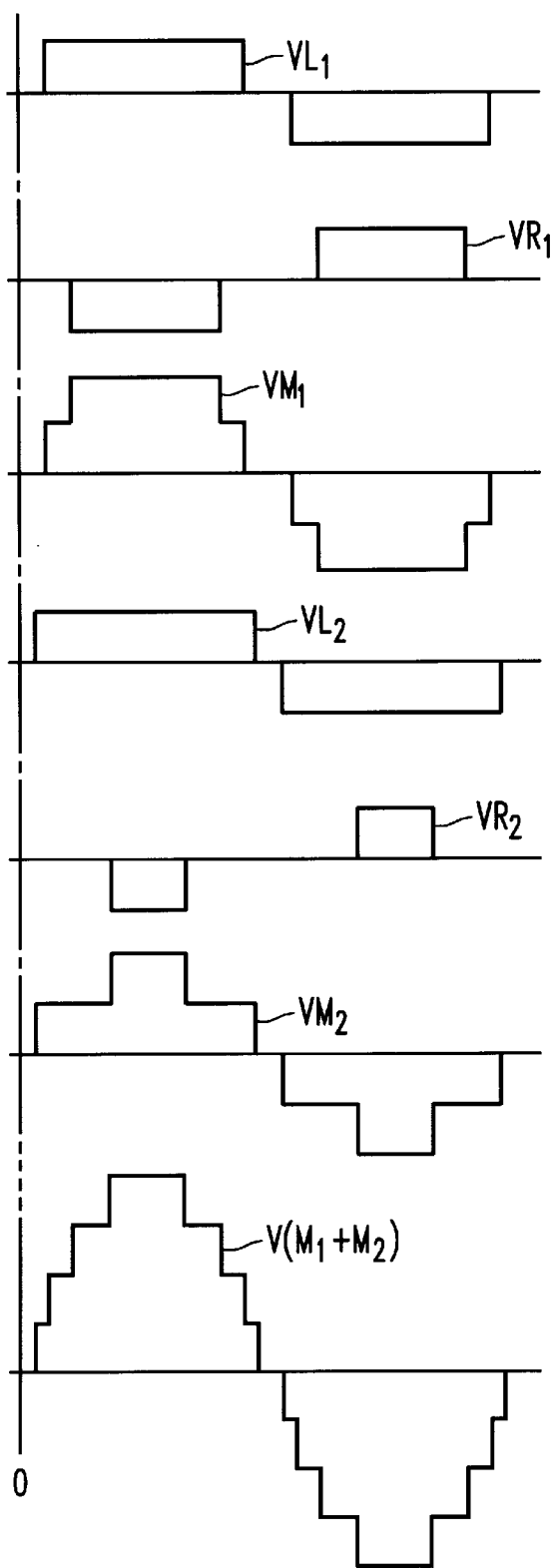
FIG. 3 is a diagram of waveforms generated by a pair of the three-level-inverter modules of the inverter shown in FIG. 2.

FIG. 3 is a waveform diagram illustrating synthesis of an ac waveform by two of the modules of the inverter of FIG. 2. The waveform VL $_1$ illustrates the voltage appearing at the ac terminal 19L $_1$ of the first inverter module 3 $_1$ and the waveform VR $_1$ is the voltage generated at the other ac terminal 19R $_1$. The waveform VL $_1$ is generated by first turning on the switch unit 9L $_2$ and 9L $_3$ to tie the terminal 19L $_1$ to the midpoint 23. Next, the switch unit 9L $_1$ is turned on and 9L $_2$ is turned off to raise the voltage at the ac terminal 19L $_1$ to the voltage at the positive dc terminal 17p. The process is then reversed with 9L $_1$ turned off and 9L $_2$ and 9L $_2$ turned on to return the ac voltage to a zero voltage level. Subsequently, the switch 9L $_4$ is turned on and 9L $_2$ is turned off to pull the voltage at the ac terminal 19L $_1$ down to the voltage at the negative dc terminal 17 $_n$. The voltage VR $_1$ at the ac terminal 19R $_1$ is generated by operating the right hand switches in the inverter module similarly but in the opposite sequence. It will be noticed that switching of the right hand switch units is phase shifted so that the voltage across the first inverter module 3 $_1$ between the ac terminals 19L $_1$ and 19R $_2$ represented by the voltage VM $_1$ is a stair step voltage having five levels.

The waveforms VL $_2$, VR $_2$ and VM $_2$ for a second module 32 are generated in a similar manner. As can be seen, the phase of these waveforms is shifted relative to those of the first module to generate additional stair steps so that the total voltage between the terminals 19L $_1$ and 19R $_2$ which is the voltage V(M $_1$+M $_2$) is as shown in FIG. 3. Pulse width modulation of each inverter unit could also be employed to further improve harmonic performance.

Figure 4:
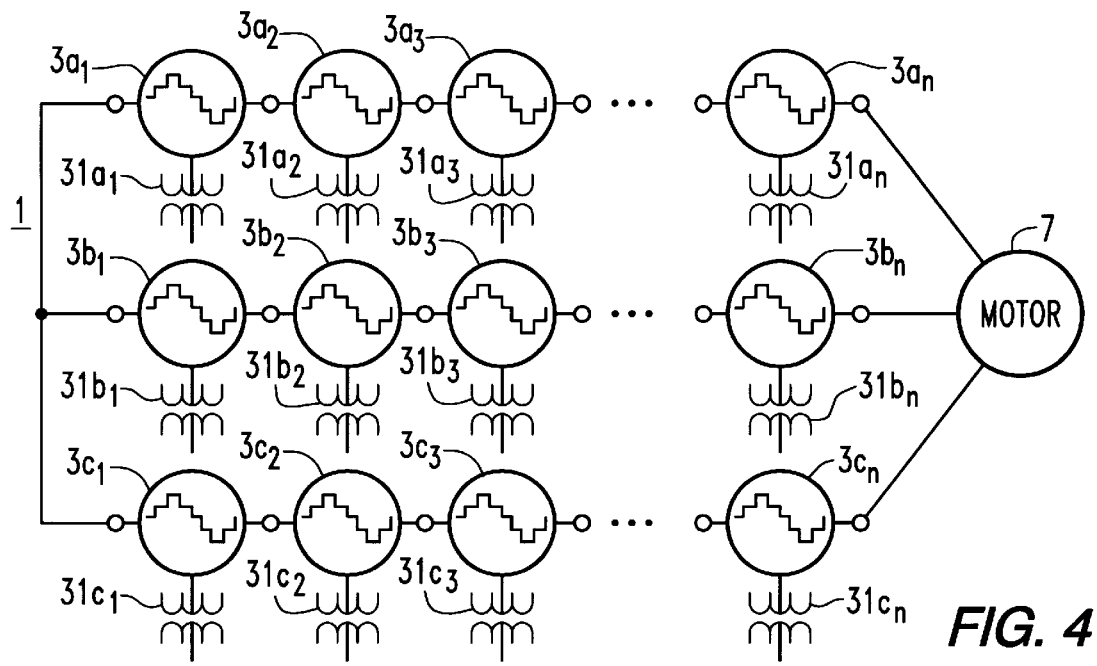
FIG. 4 is a schematic diagram of a three-phase three-voltage-level inverter with its associated ac to dc rectifier stage represented in simplified form in accordance with the invention.
Figure 5:
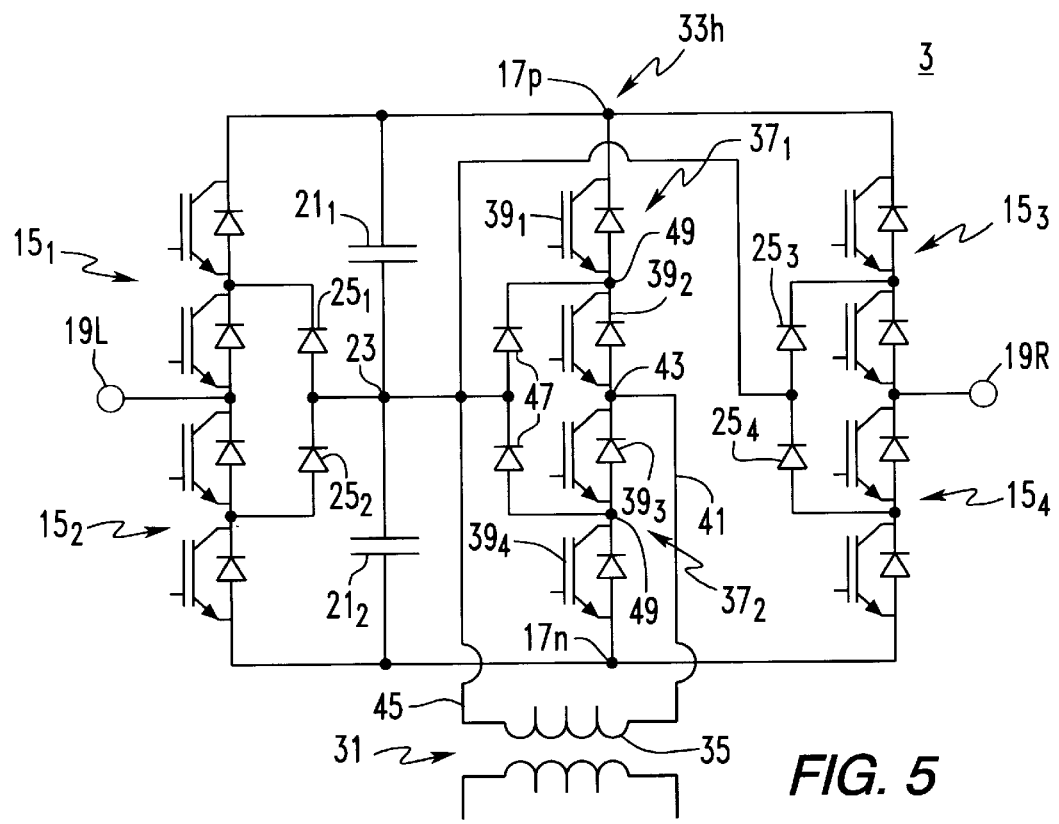
FIG. 5 is a schematic circuit diagram of a three-level inverter module in accordance with the invention having a half bridge active rectifier in the dc energy source.
Figure 6:
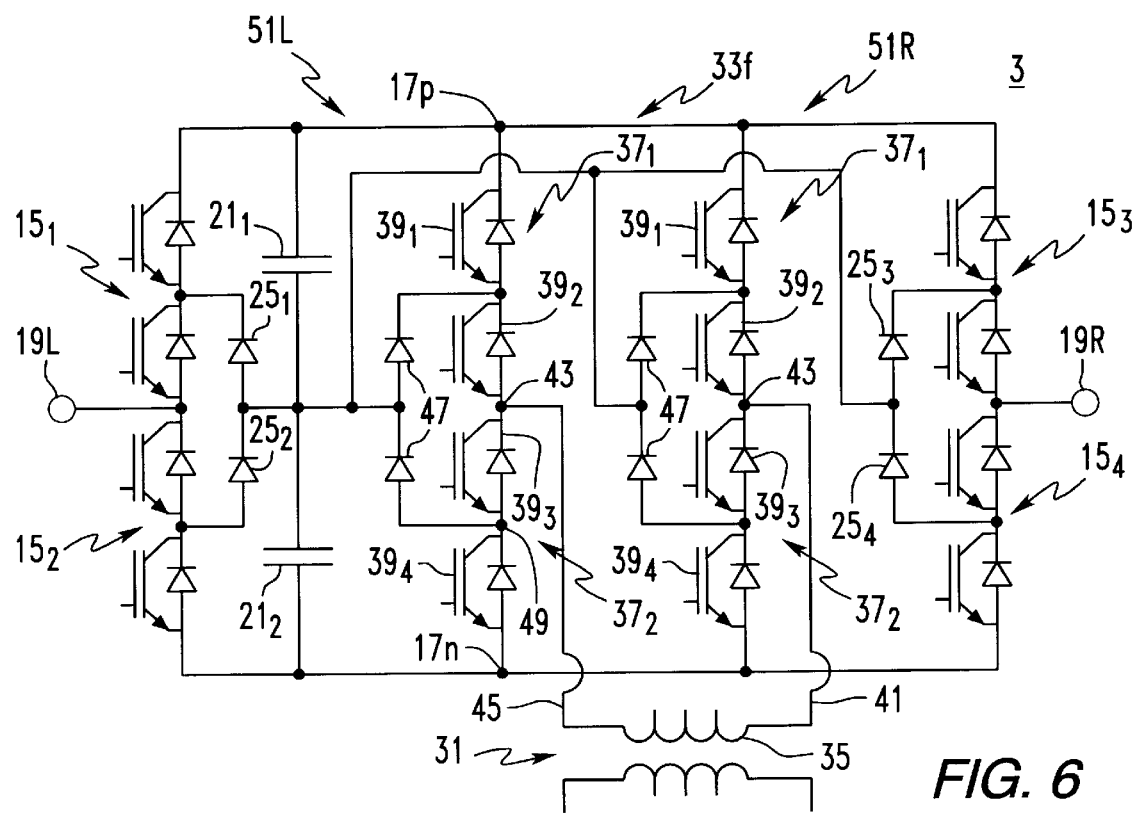
FIG. 6 is a schematic circuit diagram of a three-level inverter module in accordance with the invention having a full bridge active rectifier.

As can be appreciated, the switches of additional inverter modules 3 are controlled to generate additional properly phased waveforms which produce a resultant high voltage with a large number of stair steps. The present invention, by using multiple-voltage level poles which have multiple switch units in series between the dc terminals and the ac terminals, permits higher secondary voltages on the transformers to be used so that fewer modules 3 are needed to generate the desired output voltage. This results in a very significant saving because fewer transformers are needed. This is illustrated in FIG. 4, which is similar to FIG. 1 except that it shows the use of transformers 31 providing the dc energy for each of the inverter modules 3.

Where the load 7 is a motor as shown in FIG. 4, regenerative motor drive operation can be accommodated by replacing the diode rectifiers 33 shown in FIG. 2 with an active front end circuit in either a half-bridge configuration as shown in FIG. 5 or a full-bridge configuration as shown in FIG. 6. For the half-bridge rectifier arrangement of FIG. 5, the rectifier 33h, which forms an additional pole in the module 3, has two additional pairs 37 $_1$ and 37 $_2$ of static switching units 39 $_1$–39 $_4$ connected between the dc terminals 17p and 17n of the inverter module 3. A lead 41 connects one side of the secondary winding 35 of a transformer 31 to a node 43 between the two pair 37 $_1$ and 37 $_2$ of switch units in the rectifier 33h. Another lead 45 connects the other end of the secondary winding 35 to the midpoint 23 of the inverter module 3. Diodes 47 connect nodes 49 in the pairs of switches 37 $_1$ and 37 $_2$ to the inverter midpoint 23 and are polarized to conduct current to the midpoint when 39 $_2$ and 39 $_3$ are turned on.

When the rectifier 33h of FIG. 5 is operated in an inactive state, the anti-parallel diodes of the switch units 39 $_1$–39 $_4$ charge the capacitors 21 $_1$ and 21 $_2$ on alternate half cycles of current provided by the secondary winding 35. In this mode, the voltages on the capacitors can only be raised to the secondary voltage on the transformer. However, by controlling the switches 39, the rectifier 33h can be operated in a boost mode to increase the voltage on the capacitors 21 $_1$ and 21 $_2$ above that normally generated by the secondary winding 35. Thus, by turning on the switches 39 $_3$ and 39 $_2$ with the right hand side of the secondary winding 35 positive, the secondary winding is shorted which initiates current flow in the winding. The switch 39 $_3$ is then turned off. The voltage across the secondary winding 35 rises and the current flows through the lead 41, the anti-parallel diodes of the switches 39 $_1$ and 39 $_2$, the capacitor 21 $_1$ and the lead 45 to charge this capacitor to a voltage above the secondary voltage induced by the primary winding in the secondary. On negative half cycles, the switches 39 $_2$ and 39 $_3$ can be turned on momentarily and then off to similarly charge the capacitor 21 $_2$ to a voltage above the normal secondary voltage of the transformer. The switches 39 $_1$ and 39 $_2$ or 39 $_3$ and 39 $_4$ can be turned on simultaneously to reduce the voltage on the capacitors 21 $_1$ and 21 $_2$, respectively, or for regenerative operation.

The full wave active rectifier 33f shown in connection with the inverter module 3 in FIG. 6 includes two additional poles 51L and 51R consisting of additional pairs 37 $_1$ and 37 $_2$ of switch units connected between the positive dc terminal 17p and negative dc terminal 17n of the module. With the rectifier 33f operated in the inactive mode, the anti-parallel diodes of the switch units 39 $_1$–39 $_4$ in the two additional poles S1L and S1R provide full wave rectification which charges both capacitors 21 $_1$ and 21 $_2$. For boost mode operation, the secondary winding 35 of the transformer 31 is shorted momentarily when the right side of the winding is positive by turning on the switches 39 $_3$ and 39 $_2$ in the pole 51R and 39 $_2$ and 39 $_3$ in the pole 51L. When these switches are turned off the voltage across the secondary winding 35 builds up and the current commutates to flow through the anti-parallel diodes of the switch pair 37 $_1$ of the pole 51R and 37 $_2$ of the pole 51L. When the left side of the secondary winding 35 is positive, the winding is shorted by turning on the switches 39 $_3$ and 39 $_2$ in the pole 51L and 39 $_2$ and 39 $_3$ in the pole 51R. When these switches are turned off, current conducts through the anti-parallel diodes of the pair of switching units 37 $_1$ of the pole 51L and of the pair 37 $_2$ of the pole 51R.

In order to balance the voltages across the capacitors 21 $_1$ and 21 $_2$, the rectifier 33f can be operated as described in connection with the half wave rectifier 33h in FIG. 5. If the capacitor 21 $_1$ needs more charge, then when the right side of the secondary winding 35 is positive the switches 39 $_2$ and 39 $_3$ of the pair 37 $_1$ in the pole 51L can be turned on to bypass the capacitor 21 $_2$ and all of the charge on that half cycle would be applied to the capacitor 21 $_1$. When the left side of the secondary winding 35 is positive, the switches 39 $_2$ and $39_3$ in the pole 51R are turned on to only charge the capacitor $21_1$. Again, the switches $39_1$ and $39_4$ in the poles 51L and 51R may be used to reduce charge on a capacitor such as when a load is regenerative.

Figure 7:
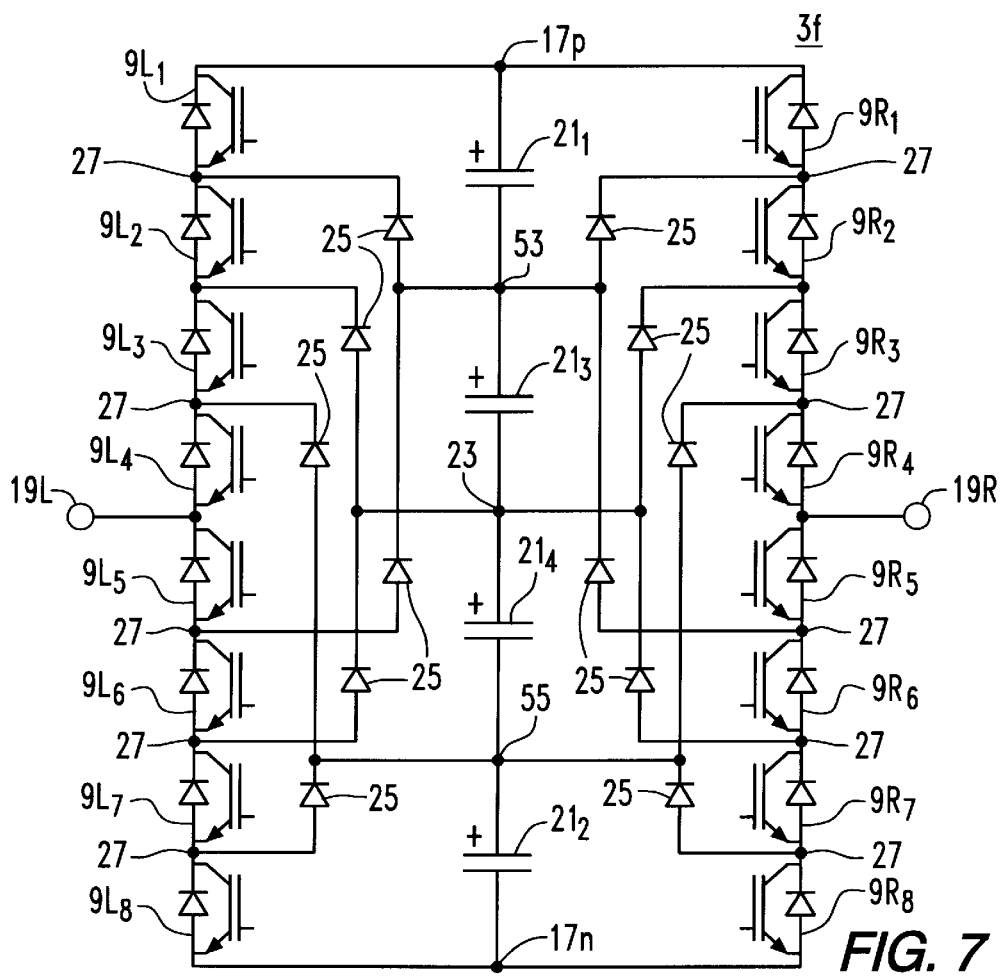
FIG. 7 is a schematic diagram of a five-level inverter module in accordance with another embodiment of the invention.

FIG. 7 illustrates a five voltage level inverter module 3f. This module has two additional capacitors $21_3$ and $21_4$ connected in series with the capacitors $21_1$ and $21_2$ between the positive dc terminal 17p and the negative dc terminal 17n generating an intermediate positive voltage level at 53 and an intermediate negative voltage level at 55. As can be seen, four switch units 9 are connected between each of the ac terminals 19L and 19R and the positive dc terminal 17p and the negative dc terminal 17n. Diodes 25 connect the midpoint 23 and intermediate points 53 and 55 to nodes 27 between the series connected switching units 9 so that, by selective switching of the switch units 9, five levels of voltage across the ac terminals 19L and 19R can be generated.

Figure 8:
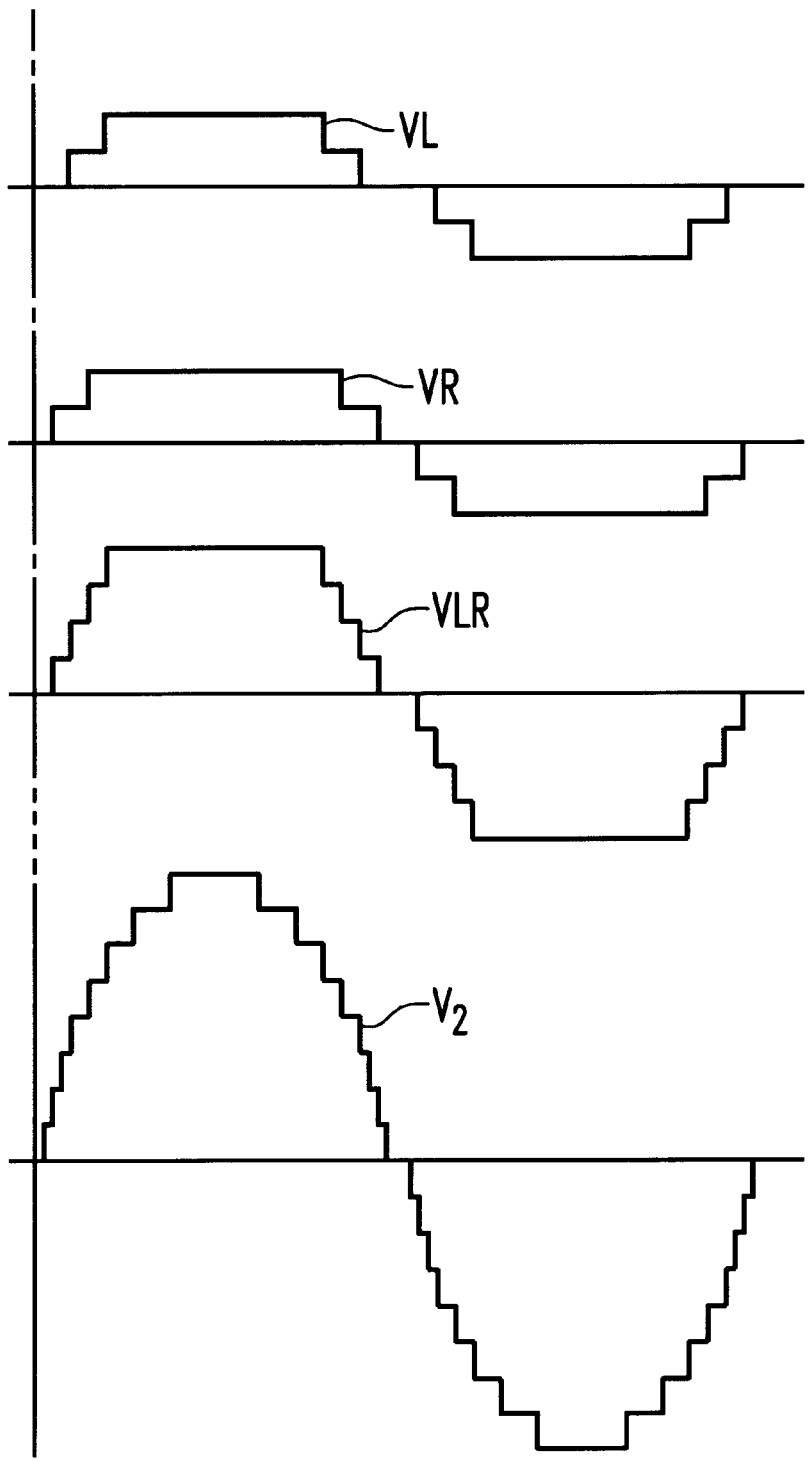
FIG. 8 is a diagram illustrating waveforms generated by two five-level inverter modules of the type shown in FIG. 7.

FIG. 8 illustrates waveforms generated by the five level inverter 3f shown in FIG. 7. VL is the voltage generated at the terminal 19L with respect to the midpoint 23 while VR is the voltage at the terminal 19R relative to the midpoint. The voltage VLR is the sum of the voltages VL and VR or the voltage across the terminals 19L and 19R. Again, the firing of the switches which generates the voltage VR is phase shifted relative to that used to generated VL so that the result is a multiple stair step output. The voltage V2 is generated by two five level inverter modules, such as the one shown in FIG. 7, connected in series. The firing of the switches in the second five level inverter module is phase shifted to produce the additional stair steps shown.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A high voltage inverter comprising:

a plurality of three voltage level inverter modules each having a positive dc terminal, a negative dc terminal, a midpoint dc terminal and ac terminals;

means connecting said ac terminals of said plurality of inverter modules in series; and dc energy means comprising an ac source, transformer means generating isolated ac power for each of said inverter modules, rectifier means rectifying said isolated ac power to produce isolated dc power for each of said inverter modules, a first capacitor connected between said positive dc terminal and said midpoint dc terminal, and a second capacitor connected between said midpoint dc terminal and said negative terminal;

wherein each of said three voltage level inverter modules comprise a first pole including a first pair of switch units connected between said positive dc terminal and a first of said ac terminals, and a second pair of switch units connected between said first ac terminal and said negative dc terminal, and a second pole including a third pair of switch units connected between said positive dc terminal and a second ac terminal and a fourth pair of switch units connected between said second ac terminal and said negative dc terminal, said switch units each including a static power switch and an anti-parallel diode, and each inverter module further includes diodes connected between said midpoint dc terminal and a node between switch units in each of said pairs of switch units, said diodes being polarized to conduct current to the midpoint dc terminal under control of the switches; and wherein said rectifier means comprises active rectifier means comprising a first additional pole having two additional pairs of switch units connected in series between said positive dc terminals and said negative dc terminals of the inverter modules, said transformer means including a secondary winding for each of said inverter modules, and wherein said rectifier means further includes means connecting a node between said two additional pairs of switch units to one side of said secondary winding of said transformer, diodes connected between said midpoint dc terminal and a node between switch units in each of said two additional pairs of switch units and polarized to conduct current to the midpoint dc terminal under control of the switches, and means connecting the other side of said secondary winding of said transformer to said midpoint dc terminal.

2. The inverter of claim 1 wherein said rectifier means is active rectifier means comprising two additional poles each including two additional pairs of switch units, each additional pole being separately connected in series between said positive dc terminals and negative dc terminals, wherein said transformer means includes a secondary winding for each of said inverter modules and the rectifier means further includes means connecting nodes between pairs of switch units in each additional pole to one side of said secondary winding of said transformer means, and including diodes connected between said midpoint dc terminal and nodes between switch units in each of said additional pairs of switch units in both additional poles and polarized to conduct current to the midpoint dc terminal under control of the switches.

* * * * *